(12) United States Patent
Oh et al.

(10) Patent No.: US 8,895,169 B2
(45) Date of Patent: Nov. 25, 2014

(54) SECONDARY BATTERY OF NOVEL STRUCTURE (71) Applicant: LG Chem, Ltd., Seoul (KR)

(72) Inventors: Kyung Su Oh, Seoul (KR); Cha-Hun Ku, Daejeon (KR); Sung Jong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/080,458

(22) Filed: Nov. 14, 2013

(65) Prior Publication Data

US 2014/0072851 A1 Mar. 13, 2014

Related U.S. Application Data

(63) Continuation of application No. PCT/KR2013/000358, filed on Jan. 17, 2013.

(30) Foreign Application Priority Data

Feb. 7, 2012 (KR) .................. 10-2012-0012341
Feb. 15, 2012 (KR) .................. 10-2012-0015088

(51) Int. Cl.
*H01M 4/00* (2006.01)
*H01M 6/10* (2006.01)
*H01M 2/26* (2006.01)
*H01M 4/66* (2006.01)
*H01M 2/04* (2006.01)
*H01M 10/04* (2006.01)
*H01M 10/0587* (2010.01)

(52) U.S. Cl.
CPC ............... *H01M 2/26* (2013.01); *H01M 4/667* (2013.01); *H01M 2/0413* (2013.01); *H01M 10/0431* (2013.01); *H01M 10/0587* (2013.01)
USPC ......................................... 429/94

(58) Field of Classification Search
CPC ..... H01M 2/26; H01M 6/10; H01M 10/0431; H01M 4/00
USPC ............................................... 429/94, 163, 11
See application file for complete search history.

(56) References Cited

U.S. PATENT DOCUMENTS

2009/0317707 A1* 12/2009 Cha ........................ 429/163
2010/0273033 A1 10/2010 Fujikawa et al.
(Continued)

FOREIGN PATENT DOCUMENTS

| JP | 11-121035 A | 4/1999 |
| JP | 2006-221890 A | 8/2006 |

(Continued)

OTHER PUBLICATIONS

English Translation of JP 2010257811 A.*

(Continued)

*Primary Examiner* — Patrick Ryan
*Assistant Examiner* — Kiran Quraishi
(74) *Attorney, Agent, or Firm* — Birch, Stewart, Kolasch & Birch, LLP (57) ABSTRACT

Disclosed is a secondary battery having a novel structure in which a jelly-roll type electrode assembly ("jelly-roll") in which a cathode including a cathode active material coated portion on at least one surface of a cathode current collector, an anode including an anode active material coated portion on at least one surface of an anode current collector, and a separator disposed therebetween are wound and an electrolyte are accommodated in a battery case, and at least one of a cathode lead coupled to a cathode uncoated portion and an anode lead coupled to an anode uncoated portion includes a first metal layer used for coupling with an electrode uncoated portion and/or coupling with a battery case and a second metal layer having a relatively lower resistance than that of the first metal layer, wherein the first and second metal layers are coupled to each other.

17 Claims, 7 Drawing Sheets

(56) References Cited

U.S. PATENT DOCUMENTS

2010/0285342 A1* 11/2010 Lee et al. .................. 429/94
2013/0244071 A1   9/2013 Lee et al.

FOREIGN PATENT DOCUMENTS

| JP | 2007-335232 A | 12/2007 | | |
| JP | 2009-21133 A | 1/2009 | | |
| JP | 2010-257811 A | 11/2010 | | |
| JP | 2010257811 A | * 11/2010 | ............. | H01M 2/26 |
| KR | 10-2009-0082561 A | 7/2009 | | |

OTHER PUBLICATIONS

International Search Report, issued in PCT/KR2013/000358, dated Apr. 29, 2013.

* cited by examiner

SECONDARY BATTERY OF NOVEL STRUCTURE

CROSS REFERENCE TO RELATED APPLICATIONS

This application is a Bypass Continuation of PCT International Application No. PCT/KR2013/000358 filed on Jan. 17, 2013, which claims priority under 35 U.S.C §119(a) to Patent Application No. 10-2012-0012341 filed in the Republic of Korea on Feb. 7, 2012 and Patent Application No. 10-2012-0015088 filed in the Republic of Korea on Feb. 15, 2012, all of which are hereby expressly incorporated by reference into the present application.

TECHNICAL FIELD

The present invention relates to a secondary battery having a novel structure. More specifically, the present invention relates to a secondary battery in which a jelly-roll type electrode assembly ("jelly-roll") in which a cathode including a cathode active material coated portion on at least one surface of a cathode current collector, an anode including an anode active material coated portion on at least one surface of an anode current collector, and a separator interposed therebetween are wound and an electrolyte are accommodated in a battery case, and at least one of a cathode lead coupled to a cathode uncoated portion and an anode lead coupled to an anode uncoated portion includes a first metal layer used for coupling with an electrode uncoated portion and/or coupling with the battery case and a second metal layer having a relatively lower resistance than that of the first metal layer, wherein the first and second metal layers are coupled to each other.

BACKGROUND ART

As mobile device technology continues to develop and demand therefor continues to increase, demand for secondary batteries as energy sources is rapidly increasing. Among these secondary batteries, research on lithium secondary batteries, which exhibit high energy density and discharge voltage, has been underway and such lithium secondary batteries are commercially available and widely used.

Secondary batteries are classified into a cylindrical or rectangular type battery including an electrode assembly in a cylindrical or rectangular metal can and a pouch type battery including an electrode assembly in a pouch type case made of an aluminum laminate sheet according to shapes of battery cases. Among these batteries, a cylindrical type battery has a relatively high capacity and structural stability.

An electrode assembly accommodated in a battery case is a rechargeable power generation device and has a stacked structure consisting of a cathode, a separator, and an anode, and is classified into a jelly-roll type electrode assembly fabricated by interposing a separator between a cathode having a long sheet shape and coated with an active material and an anode and a stacked type electrode assembly fabricated by sequentially stacking a plurality of cathodes and anodes having predetermined sizes with separators disposed therebetween. Of these, the jelly-roll type electrode assembly is easily manufactured and has high energy density per unit weight.

Figure 1:
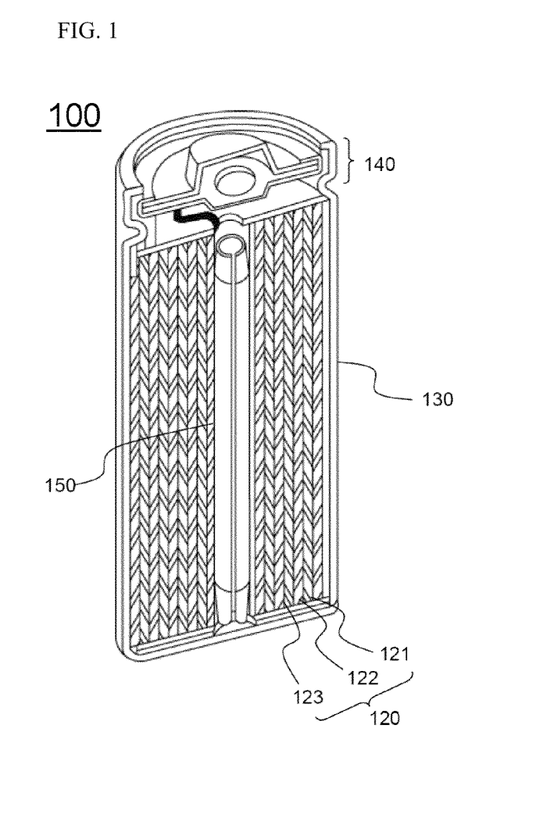
FIG. 1 is a vertical sectional perspective view of a general cylindrical battery.

With regards thereto, FIG. 1 is a vertical sectional perspective view of a general cylindrical battery 100.

Referring to FIG. 1, the cylindrical battery 100 is fabricated by placing a jelly-roll type (winding type) electrode assembly 120 in a cylindrical case 130, injecting an electrolyte into the cylindrical case 130, and connecting a top cap 140 provided with an electrode terminal (e.g., a cathode terminal, not shown) to an opening top of the cylindrical case 130.

The electrode assembly 120 has a structure in which a cathode 121, an anode 122, and a separator 123 disposed therebetween are rolled in a circular form and a center pin 150 of a cylindrical type is inserted into a winding core thereof (the center of the jelly-roll). The center pin 150 is generally made of a metal material to impart predetermined strength and has a hollow cylindrical structure formed by bending a plate in a circular form. The center pin 150 fixes and supports the electrode assembly 120 and serves as a passage through which gases generated by internal reaction during charge/discharge and operation of a battery are discharged.

Meanwhile, lithium secondary batteries have low safety. For example, when a lithium secondary battery is overcharged to approximately 4.5 V or higher, a cathode active material is decomposed, dendrite growth of lithium metal at an anode occurs, and an electrolyte solution is decomposed. Such processes involve heat and thus the above-described decomposition reactions and various side reactions rapidly proceed, which eventually leads to combustion and explosion of a battery.

Thus, to address these problems, a general cylindrical battery includes a current interrupt device (CID) and a safety vent in a space between the electrode assembly 120 and the top cap 140. In this regard, the CID and the safety vent serve to interrupt current and reduce internal pressure of a battery when the battery abnormally operates.

Figure 2:
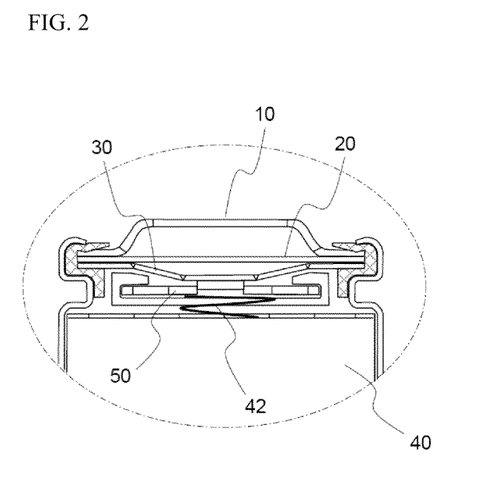
FIG. 2 is a partial sectional perspective view of FIG. 1.

In particular, referring to FIG. 2, a top cap 10 forms a cathode terminal in the form of a protrusion and is provided with a perforated vent. A positive temperature coefficient (PTC) element 20 that is disposed below the top cap 10 and greatly increases battery resistance and thereby interrupts current when an internal temperature of the battery increases, a safety vent 30, which protrudes downward in a normal state and protrudes upward as an internal pressure of a battery increases to eventually explode so as to safely discharge gases, and a connection plate 50, one side of the top of which is connected to the safety vent 30 and the other side of the bottom of which is connected to the cathode of the electrode assembly 40, are arranged under the top cap 10 in this order.

Accordingly, the cathode of the electrode assembly 40 is connected through a lead 42, the connection plate 50, the safety vent 30, and the PTC element 20 to the top cap 10 under normal operation, to supply electricity.

However, secondary batteries for power tools are operated under poor environments when compared to other batteries used under different environments and thus it is the most important to minimize heat generation by reducing internal resistance of batteries. To address these problems, conventionally, a method of increasing the size of a cathode lead or using two anode leads is used.

In particular, an existing anode lead is made of a single material such as nickel and has a single size. In addition, a material having a lower resistance than that of nickel, such as copper may be used as the anode lead, but is not suitable because it is difficult to secure processability for welding to an electrode foil or can.

Therefore, there is an urgent need to develop a technology for secondary batteries that can fundamentally address these problems and reduce resistance and heat generation while secondary batteries are used.

DISCLOSURE

Technical Problem

The present invention aims to address the aforementioned problems of the related art and to achieve technical goals that have long been sought.

The inventors of the present invention confirmed that, when at least one of a cathode lead attached to a cathode uncoated portion and an anode lead attached to an anode uncoated portion includes a first metal layer used for coupling with an electrode uncoated portion and/or a battery case and a second metal layer having a lower resistance than that of the first metal layer, wherein the first and second metal layers are coupled to each other, resistance and heat generation may be reduced by the second metal layer having a relatively low resistance while a secondary battery is used, thus completing the present invention.

In addition, the inventors of the present invention developed an electrode lead made of a particular material as described below and confirmed that, when a secondary battery is manufactured using such an electrode lead, the manufactured secondary battery has low resistance characteristics and excellent manufacturing processability such as welding with an electrode assembly, and the like, thus completing the present invention.

Technical Solution

In accordance with one aspect of the present invention, provided is a secondary battery in which a jelly-roll type electrode assembly ("jelly-roll") in which a cathode including a cathode active material coated portion on at least one surface of a cathode current collector, an anode including an anode active material coated portion on at least one surface of an anode current collector, and a separator interposed therebetween are wound and an electrolyte are accommodated in a battery case, and at least one of a cathode lead attached to a cathode uncoated portion and an anode lead attached to an anode uncoated portion includes a first metal layer used for coupling with an electrode uncoated portion and/or coupling with the battery case and a second metal layer having a lower resistance than that of the first metal layer, wherein the first and second metal layers are coupled to each other.

Thus, in the secondary battery according to the present invention, since the at least one of a cathode lead attached to a cathode uncoated portion and an anode lead attached to an anode uncoated portion includes the first metal layer used for coupling with an electrode uncoated portion and/or coupling with the battery case and the second metal layer having a relatively lower resistance than that of the first metal layer, wherein the first and second metal layers are coupled to each other, predetermined bonding strength between the cathode or anode lead and the electrode uncoated portion and/or the battery case is secured by the first metal layer having a relatively high resistance and resistance of the cathode lead and/or the anode lead is reduced by the second metal layer having a relatively low resistance, whereby resistance generated and heat generation at the electrode lead during use of the second battery may be reduced.

The battery case may be classified into a cylindrical can, a rectangular can, or a pouch type case according to the shape thereof. In this regard, a cylindrical can may be used as the battery case to manufacture a cylindrical battery having a relatively high capacity and structural stability.

In one exemplary embodiment, the first metal layer may be coupled to the electrode uncoated portion or the battery case through welding. For example, the welding process may be resistance welding and, in resistance welding, the relatively high resistance of the first metal layer provides high bonding strength for the electrode uncoated portion or the battery case.

The resistance of the second metal layer may be 10 to 70% that of the first metal layer.

In particular, when the resistance of the second metal layer is less than 10% that of the first metal layer, it is difficult to achieve desired effects of the present invention. On the other hand, when the resistance of the second metal layer exceeds 70% that of the first metal layer, performance of the secondary battery may be deteriorated due to high difference between the resistances of the first and second metal layers.

For example, the electrode lead including the first metal layer and the second metal layer coupled thereto may have an overall resistance between 2.0 and 5.0 m$\Omega$, and the resistance value is approximately 50% that (i.e., approximately 7.5 m$\Omega$) of an electrode lead including a single metal layer (e.g., consisting of a material for forming the first metal layer) having the same cross-section.

Coupling between the first metal layer and the second metal layer may be performed using any coupling method that enables coupling therebetween to be easily achieved, for example, heterogeneous material bonding. Examples of heterogeneous material bonding include heat fusion, rolling, chemical adhesion, laser welding, spot welding, plating, or coating. In particular, rolling may be used in terms of manufacturing processability.

In addition, the first and second metal layers may be coupled to each other in various ways.

In one exemplary embodiment, the first and second metal layers may be vertically coupled to each other.

In another exemplary embodiment, first metal layers may be coupled to opposite side surfaces of the second metal layer.

In general, a cathode lead is formed of aluminum (Al) or an Al alloy, and an anode lead is mainly formed of nickel (Ni) or a Ni alloy. However, the anode lead formed of Ni or a Ni alloy causes generation of a large amount of heat when the secondary battery is subjected to charging/discharging, due to high resistance of Ni. In addition, a welding portion between an anode plate and the anode lead and a welding portion between a battery case and the anode lead are portions at which heterometals are adhered to each other, and thus, welding is not easy to implement and, furthermore, heat generation may be caused due to high internal resistance of the secondary battery during charge/discharge, which leads to high-temperature short circuit and eventually cause explosion of the secondary battery.

With regards thereto, in one exemplary embodiment, the cathode lead and/or the anode lead may include a Ni or Al layer as the first metal layer and a copper (Cu) or silver (Ag) layer as the second metal layer. By using the second metal layer having a relatively low resistance, existing problems, i.e., heat generation due to increased resistance as in a conventional cathode or anode lead, may be fundamentally addressed.

In addition, the cathode lead and/or the anode lead may be selected from a combination of a Ni layer and a Cu layer, a combination of a Ni layer and a Ag layer, a combination of an Al layer and a Cu layer, and a combination of a Al layer and an Ag layer according to the magnitude of desired resistance.

The cathode or anode lead may include 5 to 95% Cu and 95 to 5% Ni based on the thickness thereof. Preferably, the cathode or anode lead may include 50% Cu and 50% Ni based on the thickness thereof.

For example, when the thickness of the Ni layer is 5% based on a total thickness of the cathode or anode lead, the Cu layer may have a thickness of 95% based thereon. On the other hand, when the thickness of the Ni layer is 95% based on the total thickness of the cathode or anode lead, the Cu layer may have a thickness of 5% based thereon. In this regard, when the Ni layer has a thickness of less than 5% based thereon, it is difficult for the cathode or anode lead to have desired bonding strength for the electrode uncoated portion, the battery case, or the like. On the other hand, when the Cu layer has a thickness of less than 5% based thereon, it is difficult to anticipate desired resistance reducing effects.

In addition, when the thickness of the Ni layer or the Cu layer exceeds 95% based on the total thickness of the cathode or anode lead, desired effects may not be obtained.

In a specific embodiment, the cathode lead or the anode lead may have a thickness of 0.05 mm to 0.15 mm.

In addition, the first metal layer may have the same thickness as that of the second metal layer, or the first metal layer may have the same width as that of the second metal layer, but embodiments of the present invention are not limited thereto.

The present invention also provides a secondary battery with electrical insulating properties and enhanced safety by attaching an insulation tape to a boundary portion of the cathode active material coated portion at a position where the cathode active material uncoated portion and the anode active material coated portion face each other.

In one exemplary embodiment, the secondary battery may have a structure in which a winding start portion of the cathode has cathode active material coated portions at upper and lower sides of the cathode current collector and thus does not include a cathode uncoated portion, only a winding end portion of the cathode includes a cathode uncoated portion at which a cathode lead is installed, and an insulation tape is provided at a boundary surface of the cathode active material coated portion located at the winding end portion of the cathode and facing the anode.

In another embodiment, the secondary battery may have a structure in which a winding start portion of the cathode has cathode active material coated portions formed at upper and lower sides of the cathode current collector and thus does not have a cathode uncoated portion, only a winding end portion of the cathode is provided with a cathode uncoated portion at which the cathode lead is installed, a cathode active material coated portion is further formed at least one surface of an end portion of the cathode uncoated portion, and an insulation tape is provided at a boundary surface of the cathode active material coated portion located at the winding end portion of the cathode and facing the anode.

A material of the insulation tape is not particularly limited so long as such material has excellent insulating properties and may be, for example, a material that is not thermally shrinkable at a temperature of up to 200° C. In addition, if the insulation tape is made of a material that is shrunken to some extent by heat, problems caused in a separator disposed between electrodes may be addressed.

The insulation tape may be at least one selected from the group consisting of a polyimide tape, an acetate tape, a glass cloth tape, a polyester tape, a polyphenylenesulfide (PPS) tape, and a polypropylene tape. In particular, a polyethylene terephthalate film may be used as the insulation tape.

In addition, the insulation tape may have a thickness of 10 μm to 100 μm.

Meanwhile, coupling between the first and second metal layers may be performed using various methods.

In one embodiment, the first and second metal layers may be coupled to the electrode uncoated portion in a state of being pre-coupled to each other, and such coupling may be desirable in terms of manufacturing processability.

In another embodiment, the first and second metal layers may be coupled to each other in a process of being coupled to the electrode uncoated portion.

The present invention also provides a secondary battery in which a jelly-roll type electrode assembly ("jelly-roll") in which a cathode including a cathode active material coated portion on at least one surface of a cathode current collector, an anode including an anode active material coated portion on at least one surface of an anode current collector, and a separator disposed therebetween are wound and an electrolyte are accommodated in a battery case, and an electrode lead including an alloy of Cu and Ni, wherein the amount of Cu is 80% or greater (based on a total content of elements), is coupled to the cathode current collector or the anode current collector through welding.

In general, alloys are complex metals obtained by adding one or more other elements to a particular metal element. In the secondary battery according to the present invention, since the electrode lead consists of an alloy including Cu as a main component and Ni as a minor component, different properties of the two heterogeneous elements are exhibited together, whereby both low resistance and excellent manufacturing processability may be obtained.

When the electrode lead is made of only Cu having low resistance, desired resistance reducing effects may be obtained, but, as described above, it is difficult to provide excellent bonding strength for an electrode plate of an electrode assembly by welding.

By contrast, the electrode lead of the secondary battery according to the present invention includes 80% or greater of Cu having very low resistance and thus operating performance of the secondary battery may be enhanced during charge and discharge. In addition, the electrode lead includes a small amount of Ni and thus provides excellent bonding strength when coupled to the cathode current collector or the anode current collector by ultrasonic welding or the like.

As seen from experimental results, which will be described below, it can be confirmed that the electrode lead of the secondary battery according to the present invention has similar welding bonding strength to that of a conventional electrode lead and exhibits resistance reducing effects, i.e., reduction of 10 to 50%.

As described above, the amount of Cu in the electrode lead is 80% or greater based on a total molar amount of the elements. When the amount of Cu is less than 80%, it is difficult to obtain desired low resistance properties.

In one exemplary embodiment, the amount of Cu in the alloy may be between 80 and 99.9% and the amount of Ni in the alloy may be between 0.1 and 20%.

As experimentally confirmed by the inventors of the present invention, when the amount of Ni is less than 0.1%, bonding strength of Ni was substantially lower than that of Cu when ultrasonic welding is performed. On the other hand, when the amount of Ni exceeds 20%, resistance was dramatically increased. In a preferred embodiment, the amount of Cu may be between 90 and 99% and the amount of Ni may be between 1 and 10%.

In some embodiments, the alloy may further include a heterogeneous element excluding Cu and Ni, and such heterogeneous element may be at least one selected from the group consisting of tin (Sn) and silicon (Si).

Sn has a higher strength and a lower resistance than Ni, and Si is a semiconductor also having a higher strength than that of Ni and thus resistances thereof decrease as temperature increases. Therefore, Sn and Si are suitable for use in the secondary battery.

The amount of the heterogeneous element may be 0.1 to 10% based on a total amount of the alloy. In this case, the amount of Cu in the alloy may be between 80 and 99.8%, the amount of Ni in the alloy may be between 0.1 and 10%, and the amount of heterogeneous element may be between 0.1 and 10%.

An electrode lead is classified into a cathode lead and an anode lead according to type of a current collector to which the electrode lead is coupled, and the electrode lead according to the present invention may be a cathode lead or an anode lead. From the experimental results described below, it can be confirmed that the electrode lead made of the alloy exhibits excellent bonding strength for each of the cathode and anode current collectors when ultrasonic welding is performed.

The electrode lead coupled to the cathode current collector and the electrode lead coupled to the anode current collector may have the same size.

The cathode current collector is generally fabricated to a thickness of 3 to 500 µm. The cathode current collector is not particularly limited so long as it does not cause chemical changes in the fabricated lithium secondary battery and has conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The anode current collector is typically fabricated to a thickness of 3 to 500 µm. The anode current collector is not particularly limited so long as it does not cause chemical changes in the fabricated secondary battery and has high conductivity. For example, the anode current collector may be made of copper, stainless steel, aluminum, nickel, titanium, sintered carbon, copper or stainless steel surface-treated with carbon, nickel, titanium, or silver, aluminum-cadmium alloys, or the like. As in the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The secondary battery according to the present invention has a structure in which the cathode and the anode, a current collector of each of which is coupled to the electrode lead, are electrically separated from each other by the separator, and this structure is impregnated with a lithium salt-containing non-aqueous electrolyte.

The cathode includes a cathode mixture, and the cathode mixture may include a cathode active material, a conductive material, a binder, a filler, and the like.

Examples of cathode active materials for lithium secondary batteries include, without being limited to, layered compounds such as lithium cobalt oxide ($LiCoO_2$) and lithium nickel oxide ($LiNiO_2$), or compounds substituted with one or more transition metals; lithium manganese oxides having the formula $Li_{1+x}Mn_{2-x}O_4$ where $0 \leq x \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-x}M_xO_2$ where M=Co, Mn, Al, Cu, Fe, Mg, B, or Ga, and $0.01 \leq x \leq 0.3$; lithium manganese composite oxides of Formula $LiMn_{2-x}M_xO_2$ where M=Co, Ni, Fe, Cr, Zn, or Ta, and $0.01 \leq x \leq 0.1$), or Formula $Li_2Mn_3MO_8$ where M=Fe, Co, Ni, Cu, or Zn; $LiMn_2O_4$ in which some of the Li atoms are substituted with alkaline earth metal ions; disulfide compounds; and $Fe_2(MoO_4)_3$.

The conductive material is typically added in an amount of 1 to 30 wt % based on the total weight of the mixture including the cathode active material. The conductive material is not particularly limited so long as it has conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the active material and the conductive material and in binding of the active material to the cathode current collector. The binder is typically added in an amount of 1 to 30 wt % based on the total weight of the mixture including the cathode active material. Examples of the binder include, without being limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The cathode may be manufactured by coating a slurry prepared by mixing the cathode mixture including the above-described compounds with a solvent such as NMP or the like on a cathode current collector and drying and rolling the coated cathode current collector.

The anode may be manufactured by coating an anode mixture including the anode active material on an anode current collector and drying the coated anode current collector and, as desired, the anode mixture may include the above-described components.

Examples of the anode material include, without being limited to, carbon such as hard carbon and graphite-based carbon; metal composite oxides such as $Li_xFe_2O_3$ where $0 \leq x \leq 1$, $Li_xWO_2$ where $0 \leq x \leq 1$, and $Sn_xMe_{1-x}Me'_yO_z$ where Me: Mn, Fe, Pb or Ge; Me': Al, B, P, Si, Group I, Group II and Group III elements, or halogens; $0 \leq x \leq 1$; $1 \leq y \leq 3$; and $1 \leq z \leq 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The separator is disposed between the cathode and the anode and, as the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of a non-aqueous electrolyte and a lithium salt. As the non-aqueous electrolyte, a non-aqueous organic solvent, an organic solid electrolyte, or an inorganic solid electrolyte may be used.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

Meanwhile, the jelly-roll type electrode assembly is fabricated by coating an electrode active material or the like on a metal foil used as a current collector, drying and pressing the coated metal foil, cutting the metal foil so as to have a band form having desired width and length, separating an anode from a cathode using a separator, and rolling the resulting structure in a spiral form. Jelly-rolls are mainly used in cylindrical batteries and, in some cases, a jelly-roll may be compressed so as to have a plate form and thus applied to rectangular batteries or pouch-type batteries.

Thus, the electrode lead formed of an alloy is connected to the cathode and the anode of the jelly-roll type electrode assembly. More particularly, the electrode lead is coupled to an uncoated portion of the electrode mixture where an electrode active material is not coated.

Welding of the electrode lead to a current collector may be performed using various methods, for example, arc welding, ultrasonic welding, resistance welding, and the like. In particular, ultrasonic welding is a welding method using vibration generated through application of ultrasonic waves while applying pressure to materials to be welded and is performed such that impurities and the like present between the pressurized materials are removed by high-frequency vibration energy generated by ultrasonic waves of about 20 KHz and a gap between the materials to be welded is reduced to an interatomic distance.

The electrode lead according to the present invention is coupled to the cathode current collector or the anode current collector through welding, preferably ultrasonic welding, which may more reduce resistance of the coupled region therebetween and thus prevent loss of heat generated, than other welding methods.

The present invention also provides a power tool including the secondary battery as a power source.

In particular, power tools are used in operations causing vibration and thus secondary batteries used as a power source for power tools must have a small internal resistance.

Since the secondary battery according to the present invention includes the electrode lead having a lower resistance than that of an electrode lead of a conventional secondary battery, the secondary battery is suitable for use in power tools.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, embodiments of the present invention will be described in more detail with reference to the accompanying drawings. These embodiments are provided for illustrative purposes only and should not be construed as limiting the scope and spirit of the present invention.

Figure 3:
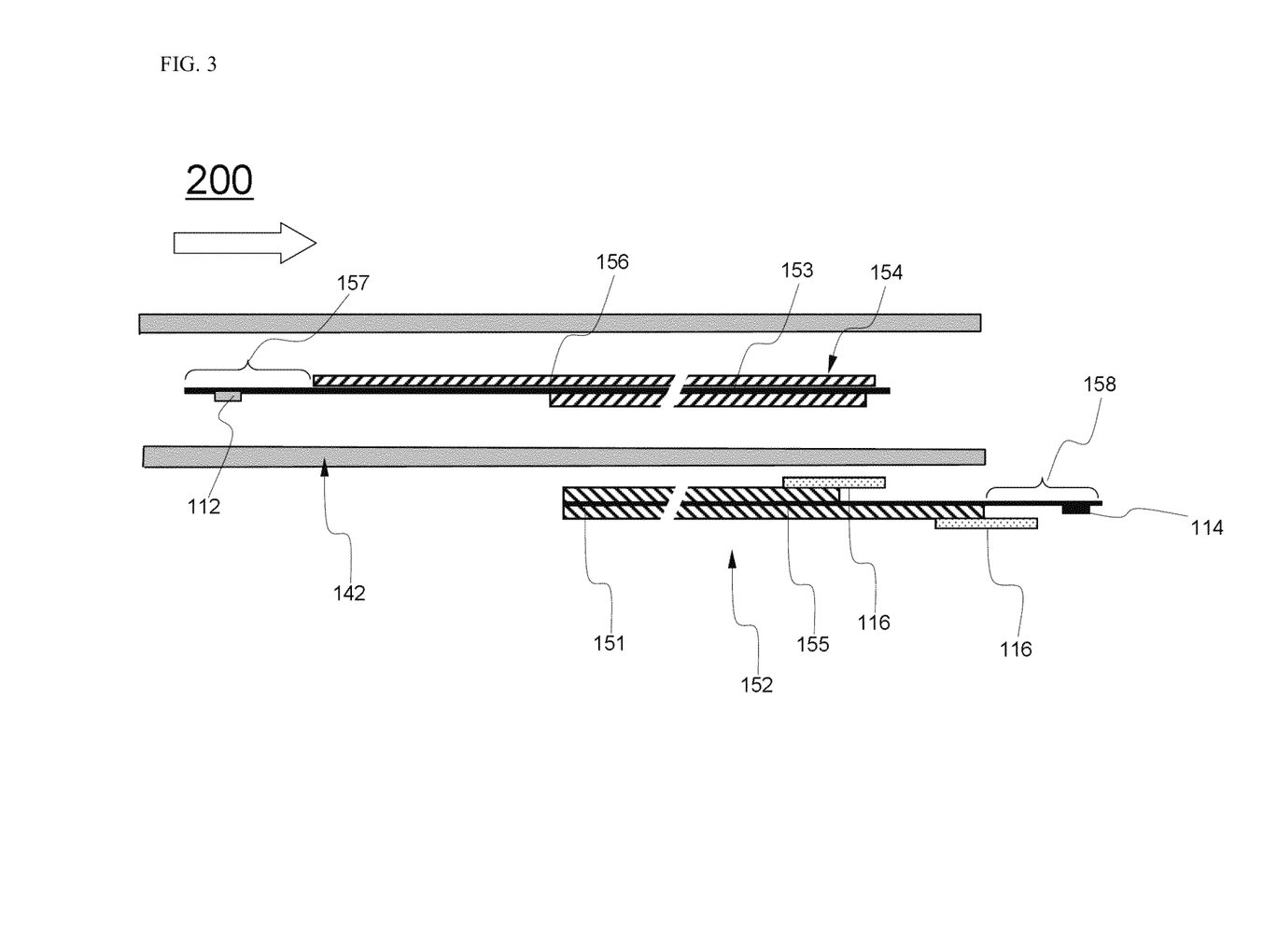
FIG. 3 is a partial horizontal sectional view of a jelly-roll type electrode assembly according to an embodiment of the present invention prior to winding thereof.
Figure 4:
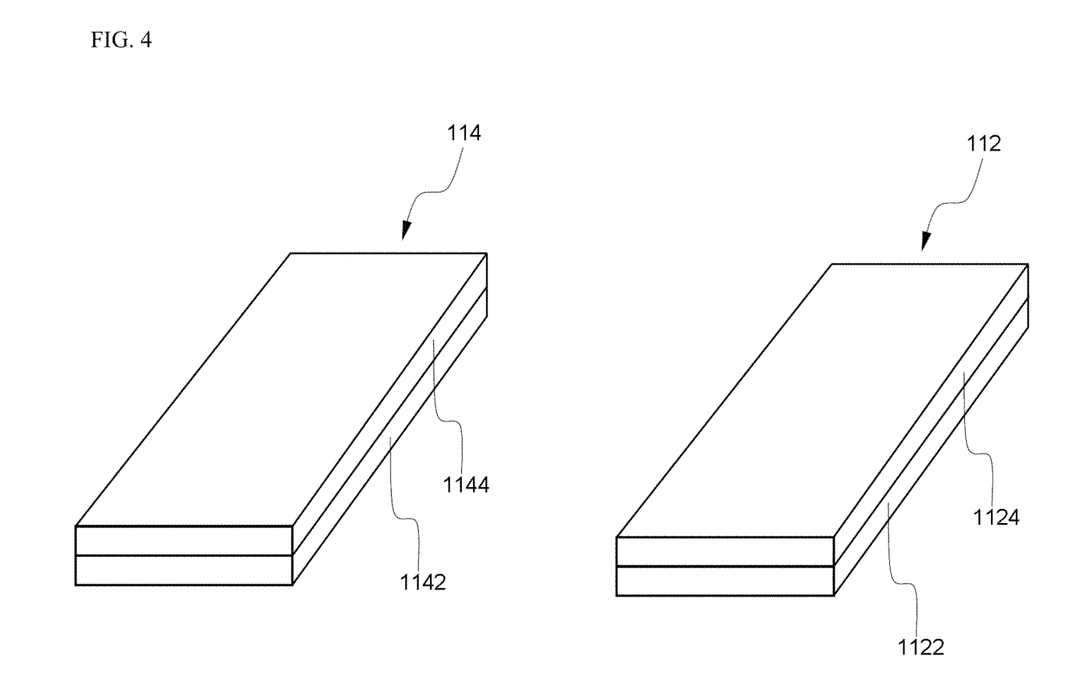
FIG. 4 is a perspective view of a cathode lead and an anode lead of FIG. 3.

FIG. 3 is a partial horizontal sectional view of a jelly-roll type electrode assembly 200 according to an embodiment of the present invention prior to winding thereof FIG. 4 is a perspective view of a cathode lead and an anode lead of FIG. 3.

Referring to FIGS. 3 and 4, a cylindrical battery has a structure in which the jelly-roll type electrode assembly 200 in which a cathode 152 including cathode active material coated portions 155 on opposite surfaces of a cathode current collector 151, insulation tapes 116 located at the end of the cathode active material coated portion 155, an anode 154 including anode active material coated portions 156 on opposite surfaces of an anode current collector 153, and a separator 142 interposed therebetween are wound and an electrolyte are accommodated in a cylindrical can (not shown).

In addition, a cathode lead 114 coupled to a cathode uncoated portion 158 includes a first metal layer 1142 used for coupling with the cathode uncoated portion 158 and a second metal layer 1144 having a relatively lower resistance than that of the first metal layer 1142, wherein the first and second metal layers 1142 and 1144 are vertically coupled to each other by rolling. An anode lead 112 coupled to an anode uncoated portion 157 includes a first metal layer 1122 used for coupling with the anode uncoated portion 157 and a second metal layer 1124 having a relatively lower resistance than that of the first metal layer 1122.

The first metal layer 1122 of the anode lead 112 is coupled to the anode uncoated portion 157 by resistance welding, and the resistance of the second metal layer 1124 is about 50% the resistance of the first metal layer 1122.

In addition, the first metal layer 1142 of the cathode lead 114 is coupled to the cathode uncoated portion 158 by resistance welding, and the resistance of the second metal layer 1144 is about 50% the resistance of the first metal layer 1142.

In addition, each of the cathode lead 114 and the anode lead 112 consists of 50% Cu and 50% Ni based on the thickness thereof, and the first metal layer 1142 has the same thickness as that of the second metal layer 1144 and the first metal layer 1122 has the same thickness as that of the second metal layer 1124.

In addition, the first metal layer 1142 has the same width as that of the second metal layer 1144, the first metal layer 1122 has the same width as that of the second metal layer 1124, the first metal layers 1142 and 1122 are a Ni layer or an Al layer, and the second metal layers 1144 and 1124 are a Cu layer or a Ag layer.

In addition, the first metal layer 1142 and the second metal layer 1144 are coupled to the cathode uncoated portion 114 in a state of being pre-coupled with each other, and the first metal layer 1122 and the second metal layer 1124 are coupled to the anode uncoated portion 112 in a state of being pre-coupled with each other.

As described above, the structure illustrated in FIG. 4 is provided for illustrative purposes only and thus a multilayer structure including a first metal layer (a)-a second metal layer (b)-a first metal layer (c), and the like may be used. In addition, in this structure, the first metal layer (a) and the first metal layer (c) may have different components, thicknesses, widths, and the like.

Figure 5:
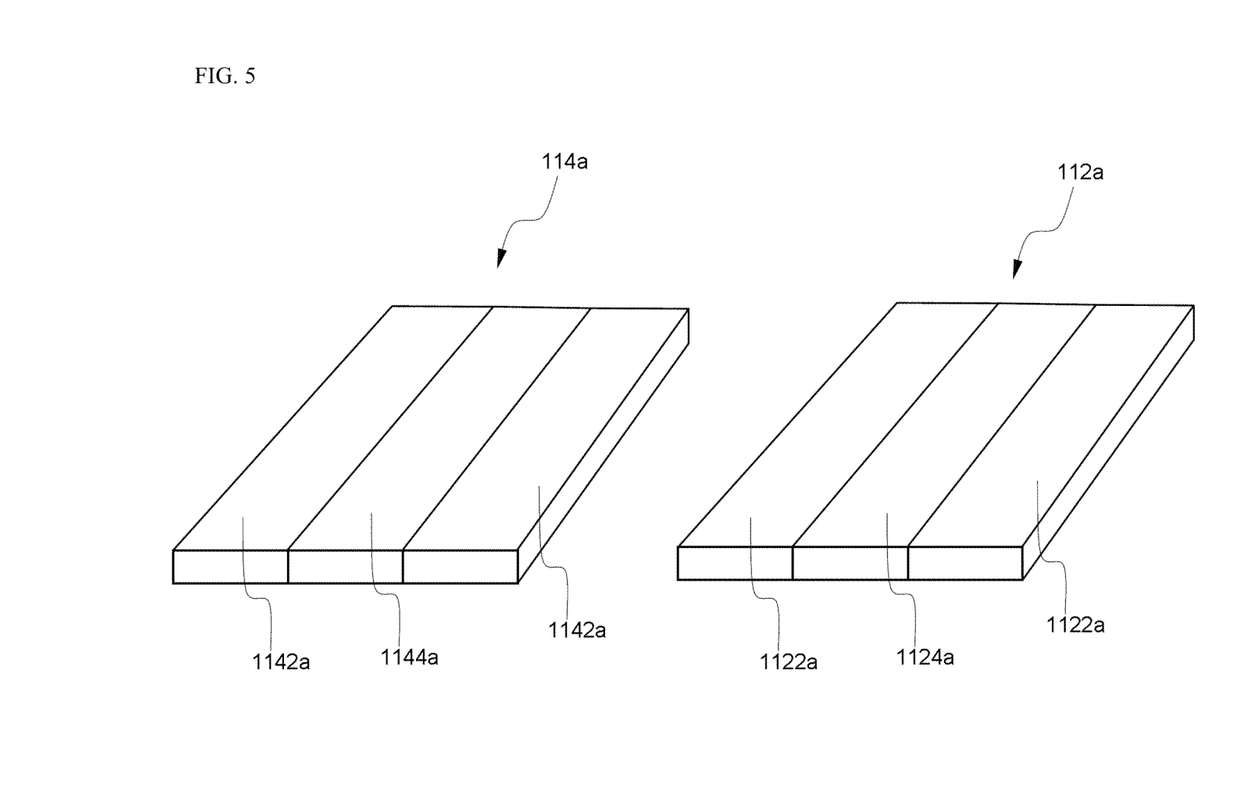
FIG. 5 is a perspective view of a cathode lead and an anode lead, according to another embodiment of the present invention.

FIG. 5 is a perspective view of a cathode lead 114a and an anode lead 112a, according to another embodiment of the present invention.

Referring to FIG. 5, the cathode lead 114a has a structure in which first metal layers 1142a are respectively coupled to opposite side surfaces of a second metal layer 1144a, and the anode lead 112a has a structure in which first metal layers 1122a are respectively coupled to opposite side surfaces of a second metal layer 1124a.

In addition, the first metal layer 1142a has the same thickness and width as the second metal layer 1144a, and the first metal layer 1122a has the same thickness and width as the second metal layer 1124a.

Figure 6:
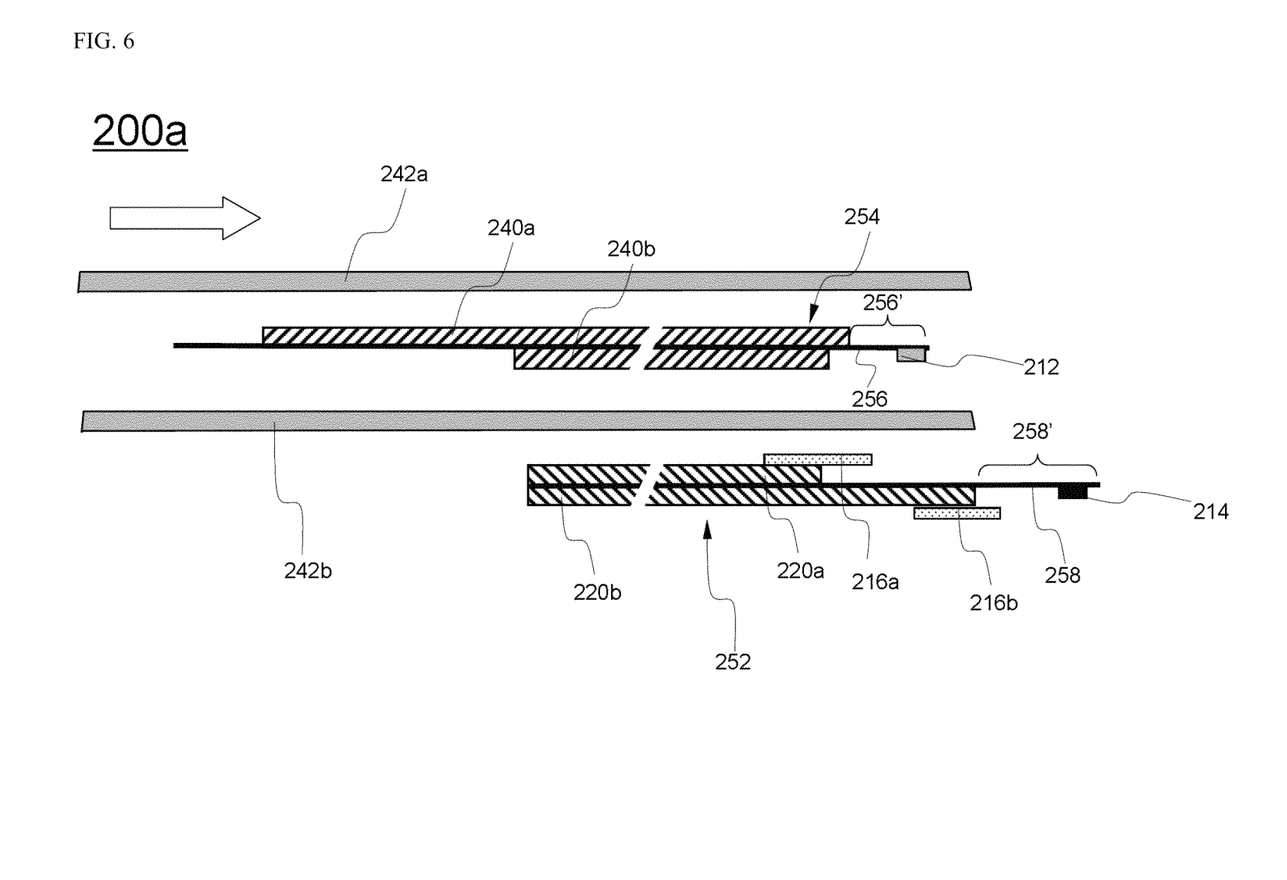
FIGS. 6 and 7 are partial horizontal sectional views of jelly-roll type electrode assemblies according to other embodiments of the present invention prior to winding thereof.
Figure 7:
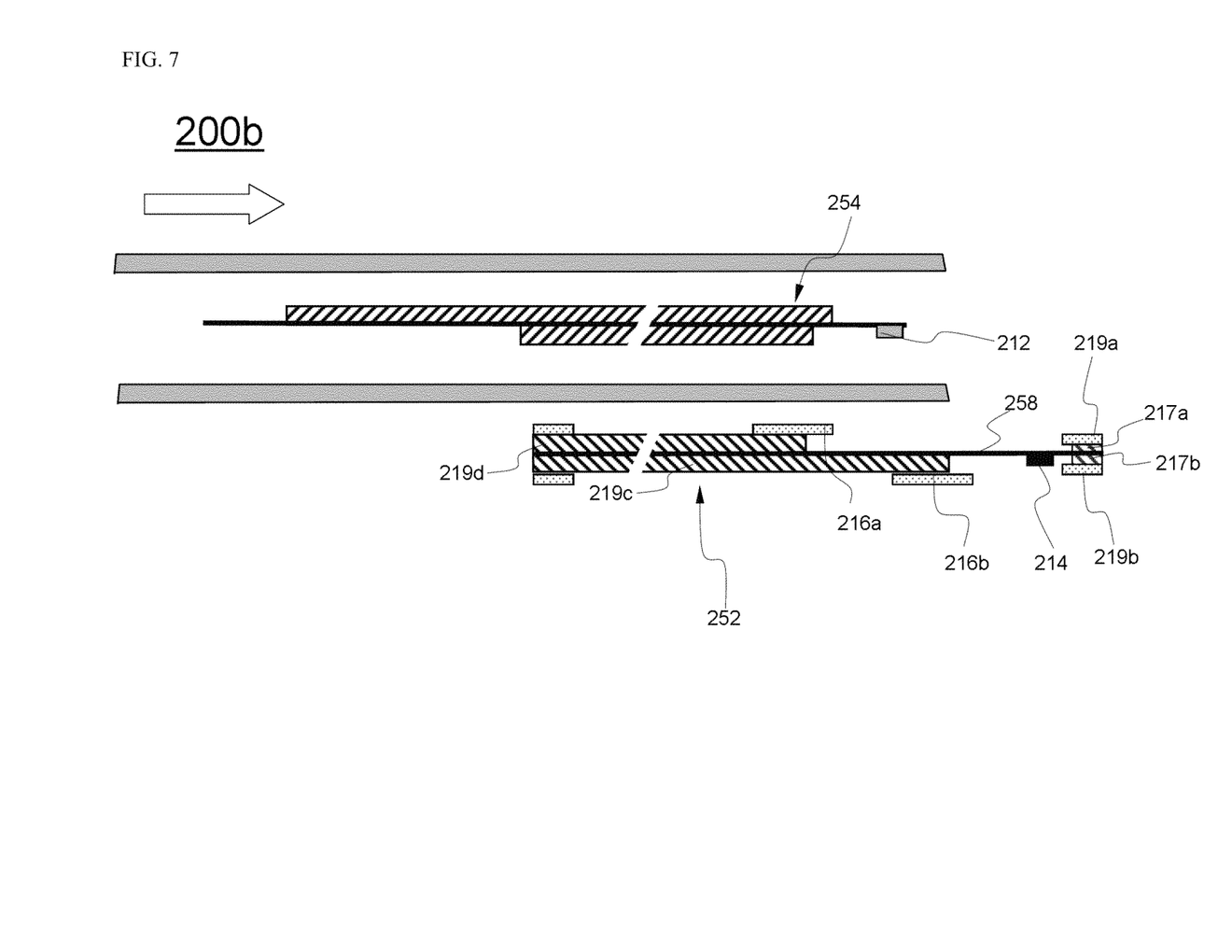

FIGS. 6 and 7 are partial horizontal sectional views of jelly-roll type electrode assemblies 200a and 200b according to other embodiments of the present invention prior to winding thereof.

Referring to FIG. 6, in the jelly-roll type electrode assembly 200a, a winding start portion of a cathode 252 has cathode active material coated portions 220a and 220b on both upper and lower surfaces of a cathode current collector 258 and thus does not include a cathode uncoated portion and only a winding end portion of the cathode 252 includes a cathode uncoated portion 258' for installation of a cathode lead 214.

In addition, insulation tapes 216a and 216b are located at the winding end portion of the cathode 252 and are attached to boundary surfaces of the respective cathode active material coated portions 220a facing an anode 254.

The anode 254 includes anode active material coated portions 240a and 240b on opposite surfaces of an anode current collector 256, and a winding end portion of the anode current collector 256 includes an anode uncoated portion 256' which is not coated with an anode active material. In this regard, an anode lead 212 for connection to an external terminal is connected to the anode uncoated portion 256'.

In addition, separators 242a and 242b are configured to extend longer than an end portion of the anode 254 and thus, even though the separators 242a and 242b contract, the anode 254 is blocked.

The anode active material coated portion 240a, which is a winding end portion, on an upper surface of the anode current collector 256 contacts an boundary surface of the cathode active material coated portion 220b on the lower surface of the cathode current collector 258 at which the cathode lead 214 is installed, with the separator 242a disposed therebetween. In this regard, the insulation tape 216b is further attached to the boundary surface of the cathode active material coated portion 220b and thus short circuit between the anode active material coated portion 240a and the cathode uncoated portion 258', which is not coated with the cathode active material, is prevented.

In addition, the anode active material coated portion 240b, which is a winding end portion, on a lower surface of the anode current collector 256 contacts a boundary surface of the cathode active material coated portion 220a on the upper surface of the cathode current collector 258 at which the cathode lead 214 is installed, with the separator 242b disposed therebetween. In this regard, the insulation tape 216a is further attached to the boundary surface of the cathode active material coated portion 220a so as not to contact the cathode uncoated portion 258' of the cathode current collector 258.

Referring to FIG. 7, in the jelly-roll type electrode assembly 200b, a winding start portion of the cathode 252 has cathode active material coated portions 219c and 219d on upper and lower surfaces of the cathode current collector 258 and thus does not include a cathode uncoated portion, and only a winding end portion of the cathode 252 includes a cathode uncoated portion for installation of the cathode lead 214.

In addition, cathode active material coated portions 217a and 217b are formed on opposite surfaces of an end portion of the cathode uncoated portion, and a second insulation tape 219a is attached to an upper surface of the cathode active material coated portion 217a and a second insulation tape 219b is attached to a lower surface of the cathode active material coated portion 217b.

In addition, first insulation tapes 216a and 216b are respectively attached, at the winding end portion of the cathode 252, to boundary surfaces of the respective cathode active material coated portions 219c and 219d facing the anode 254.

Hereinafter, embodiments of the present invention will be described in further detail with reference to the following examples. These examples are provided for illustrative purposes only and should not be construed as limiting the scope and spirit of the present invention.

Example 1

An anode lead of an alloy consisting of 96% Cu (based on a total content of elements), 3% Ni, and 1% Sn was manufactured, and a cathode lead made of Al was prepared. The cathode and anode leads were respectively coupled to uncoated portions of a cathode and an anode through ultrasonic welding, the cathode, the anode, and a separator disposed therebetween were wound to form a jelly-roll, the resulting structure was inserted into a cylindrical can made of stainless steel, and an electrolyte was injected thereinto, thereby completing fabrication of a battery cell.

Example 2

A battery cell was manufactured in the same manner as in Example 1, except that an anode lead of an alloy consisting of 89% Cu, 10% Ni, and 1% Sn was fabricated.

Comparative Example 1

A battery cell was manufactured in the same manner as in Example 1, except that an anode lead of an alloy consisting of 99% Ni and 1% Sn was fabricated.

Experimental Example 1

First, resistance and strength of the anode lead of each of the battery cells manufactured according to Examples 1 and 2 and Comparative Example 1 were measured. As a result of measurement, it was confirmed that the anode leads of the battery cells of Examples 1 and 2 had similar bonding strength to that of the anode lead of the battery cell of Comparative Example 1 and exhibited resistance reducing effects, i.e., reduction in resistance between about 10 and about 50%.

In addition, performance of the battery cells of Examples 1 and 2 and Comparative Example 1 after 100 charging/discharging cycles was tested. As a result of testing, it was confirmed that the battery cells of Examples 1 and 2 had an improvement on performance of approximately 10% or more.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, in a secondary battery according to the present invention, at least one of a cathode lead coupled to a cathode uncoated portion and an anode lead coupled to an anode uncoated portion includes a first metal layer used for coupling with an electrode uncoated portion and/or coupling with a battery case and a second metal layer having a relatively lower resistance than that of the first metal layer, wherein the first and second metal layers are coupled to each other, and thus, the electrode lead provides predetermined bonding strength to the electrode uncoated portion or the battery case and resistance at an electrode lead portion and generation of heat therefrom during use of the secondary battery may be significantly reduced.

In addition, the electrode lead of the secondary battery consists of an alloy including Cu, Ni, or the like. As such, since the electrode lead includes Cu having low electrical resistance, Ni exhibiting high bonding strength properties, or the like, operating characteristics of the secondary battery during charge/discharge may be enhanced and excellent manufacturing processability may be provided.

The invention claimed is:

1. A secondary battery in which a jelly-roll type electrode assembly ("jelly-roll") in which a cathode comprising a cathode active material coated portion on at least one surface of a cathode current collector, an anode comprising an anode active material coated portion on at least one surface of an anode current collector, and a separator disposed therebetween are wound and an electrolyte are accommodated in a battery case, and
at least one of a cathode lead coupled to a cathode uncoated portion and an anode lead coupled to an anode uncoated portion comprises a first metal layer used for coupling with an electrode uncoated portion and/or coupling with the battery case and a second metal layer having a relatively lower resistance than that of the first metal layer, wherein the first and second metal layers are coupled with each other,
wherein the first metal layers are respectively coupled to opposite side surfaces of the second metal layer such that the first metal layer and the second metal layer are coplanar.

2. The secondary battery according to claim 1, wherein the battery case is a cylindrical can.

3. The secondary battery according to claim 1, wherein the first metal layer is coupled to the electrode uncoated portion or the battery case through welding.

4. The secondary battery according to claim 1, wherein the second metal layer has a resistance of 10 to 70% that of the first metal layer.

5. The secondary battery according to claim 1, wherein the first and second metal layers are coupled to each other by heterogeneous material bonding.

6. The secondary battery according to claim 5, wherein the heterogeneous material bonding is heat fusion, rolling, chemical adhesion, laser welding, spot welding, plating, or coating.

7. The secondary battery according to claim 1, wherein the first metal layer is a nickel (Ni) layer or an aluminum (Al) layer, and the second metal layer is a copper (Cu) layer or a silver (Ag) layer.

8. The secondary battery according to claim 1, wherein the cathode lead or the anode lead comprises 5 to 95% Cu and 95 to 5% Ni based on a thickness thereof.

9. The secondary battery according to claim 8, wherein the cathode lead or the anode lead comprises 50% Cu and 50% Ni based on the thickness thereof.

10. The secondary battery according to claim 1, wherein the cathode lead or the anode lead has a thickness of 0.05 to 0.15 mm.

11. The secondary battery according to claim 1, wherein the first metal layer has the same thickness as that of the second metal layer.

12. The secondary battery according to claim 1, wherein the first metal layer has the same width as that of the second metal layer.

13. The secondary battery according to claim 1, wherein a winding start portion of the cathode has cathode active material coated portions on upper and lower surfaces of the cathode current collector and thus does not comprise a cathode uncoated portion, only a winding end portion of the cathode comprises a cathode uncoated portion for installation of the cathode lead, and an insulation tape is provided at a boundary surface of the cathode active material coated portion located at the winding end portion of the cathode and facing the anode.

14. The secondary battery according to claim 1, wherein a winding start portion of the cathode has cathode active material coated portions on upper and lower surfaces of the cathode current collector and thus does not comprise a cathode uncoated portion, only a winding end portion of the cathode comprises a cathode uncoated portion for installation of the cathode lead, a cathode active material coated portion is further formed on at least one surface of an end portion of the cathode uncoated portion, and an insulation tape is provided at a boundary surface of the cathode active material coated portion located at the winding end portion of the cathode and facing the anode.

15. The secondary battery according to claim 1, wherein the first metal layer and the second metal layer are coupled to the electrode uncoated portion in a state of being pre-coupled to each other.

16. The secondary battery according to claim 1, wherein the first metal layer and the second metal layer are coupled to each other in a process of being coupled to the electrode uncoated portion.

17. A power tool comprising the secondary battery according to claim 1 as a power source.

* * * * *